(12) United States Patent
Hu et al.

(10) Patent No.: US 10,969,544 B1
(45) Date of Patent: Apr. 6, 2021

(54) GRATING-BASED FILTERS FOR PHOTONICS APPLICATIONS

(71) Applicant: GLOBALFOUNDRIES U.S. Inc., Santa Clara, CA (US)

(72) Inventors: Shuren Hu, White Plains, NY (US); Bo Peng, Wappingers Falls, NY (US); David Riggs, New Fairfield, CT (US); Karen Nummy, Newburgh, NY (US); Kevin K. Dezfulian, Arlington, VA (US); Francis Afzal, Nashville, TN (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 0 days.

(21) Appl. No.: 16/682,354

(22) Filed: Nov. 13, 2019

(51) Int. Cl.
*G02B 6/12* (2006.01)
*G02B 6/293* (2006.01)
*G02B 6/02* (2006.01)

(52) U.S. Cl.
CPC ..... *G02B 6/12019* (2013.01); *G02B 6/02085* (2013.01); *G02B 6/12016* (2013.01); *G02B 6/29334* (2013.01); *G02F 2201/302* (2013.01)

(58) Field of Classification Search
CPC ............ G02B 6/12019; G02B 6/02085; G02B 6/12016; G02B 6/29334; G02B 6/34
USPC ............................................. 385/14, 24, 37
See application file for complete search history.

(56) References Cited

U.S. PATENT DOCUMENTS

| 4,923,271 A | * | 5/1990 | Henry ................ G02B 6/29328 385/24 |
| 6,876,793 B1 | | 4/2005 | Ling et al. |

OTHER PUBLICATIONS

Shi et al., "Ultra-compact, flat-top demultiplexer using anti-reflection contra-directional couplers for CWDM networks on silicon" Optics Express vol. 21, Issue 6, pp. 6733-6738 (2013).
Naghdi et al., "Silicon Photonic Four-Channel Optical Add-Drop Multiplexer Enabled by Subwavelength Grating Waveguides" IEEE Photonics Journal, vol. 10, No. 4, pp. 1-10, Aug. 2018, Art No. 6601510.
Naghdi et al.,"Silicon photonic contradirectional couplers using subwavelength grating waveguides" Optics Express vol. 24, Issue 20, pp. 23429-23438 (2016).

(Continued)

*Primary Examiner* — Michael P Mooney
(74) *Attorney, Agent, or Firm* — Thompson Hine LLP; Francois Pagette

(57) ABSTRACT

Structures for a filter and methods of fabricating a structure for a filter. The filter is coupled to a waveguide core. The filter includes a first plurality of grating structures positioned adjacent to a first section of the waveguide core and a second plurality of grating structures positioned adjacent to a second section of the waveguide core. The first plurality of grating structures are configured to cause laser light in a first portion of a wavelength band to be transferred between the first section of the waveguide core and the first plurality of grating structures. The second plurality of grating structures are configured to cause laser light in a second portion of a wavelength band to be transferred between the second section of the waveguide core and the second plurality of grating structures.

20 Claims, 5 Drawing Sheets

(56) References Cited

OTHER PUBLICATIONS

Liu et al., "High-suppression-ratio silicon bandpass filter using apodized subwavelength grating coupler" 2017 Conference on Lasers and Electro-Optics Pacific Rim (CLEO-PR), Singapore, 2017, pp. 1-2.
Liu et al., "Spectral engineering of subwavelength-grating-based contradirectional couplers" Optics Express vol. 25, Issue 21, pp. 25310-25317 (2017).

\* cited by examiner

GRATING-BASED FILTERS FOR PHOTONICS APPLICATIONS

BACKGROUND

The present invention relates to photonics chips and, more specifically, to structures for a filter and methods of fabricating a structure for a filter.

Photonics chips are used in many applications and systems including, but not limited to, data communication systems and data computation systems. A photonics chip integrates optical components, such as waveguides, optical switches, and bends, and electronic components, such as field-effect transistors, into a unified platform. Among other factors, layout area, cost, and operational overhead may be reduced by the integration of both types of components in the photonics chip.

Wavelength-division multiplexing is a technology that multiplexes multiple data streams onto an optical link. In a wavelength-division multiplexing scheme, the set of data streams includes different channels of laser light and each channel is characterized by a specific wavelength band. Each of the different channels of laser light may be transferred to the optical link using a wavelength-division multiplexing filter. At a receiver side of the optical link, a wavelength-division multiplexing filter of the same type, but used in reverse, may be used to separate (i.e., de-multiplex) the different channels back into the individual data streams.

One type of wavelength-division multiplexing scheme may rely on cascaded Mach-Zehnder interferometer (MZI) modulators. A Mach-Zehnder interferometer modulator inherently exhibits a weak electro-optic effect and, for that reason, a Mach-Zehnder interferometer modulator must have a large form factor. The large form factor results in a large footprint on the photonics chip. Hence, incorporation of a Mach-Zehnder interferometer modulator may adversely impact the layout area of a photonics chip, especially when cascaded Mach-Zehnder interferometer modulators are utilized in the context of wavelength-division multiplexing filters. Mach-Zehnder interferometer modulators are also sensitive to fabrication variations, which may impact filter performance.

Improved structures for a filter and methods of fabricating a structure for a filter are needed.

SUMMARY

In an embodiment of the invention, a structure includes a waveguide core and a filter coupled to the waveguide core. The filter includes a first plurality of grating structures positioned adjacent to a first section of the waveguide core and a second plurality of grating structures positioned adjacent to a second section of the waveguide core. The first plurality of grating structures are configured to cause laser light in a first portion of a wavelength band to be transferred between the first section of the waveguide core and the first plurality of grating structures. The second plurality of grating structures are configured to cause laser light in a second portion of the wavelength band to be transferred between the second section of the waveguide core and the second plurality of grating structures.

In an embodiment of the invention, a method includes forming a waveguide core, forming a first plurality of grating structures positioned adjacent to a first section of the waveguide core, and forming a second plurality of grating structures positioned adjacent to a second section of the waveguide core. The first plurality of grating structures are configured to cause laser light in a first portion of a wavelength band to be transferred between the first section of the waveguide core and the first plurality of grating structures. The second plurality of grating structures are configured to cause laser light in a second portion of the wavelength band to be transferred between the second section of the waveguide core and the second plurality of grating structures.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
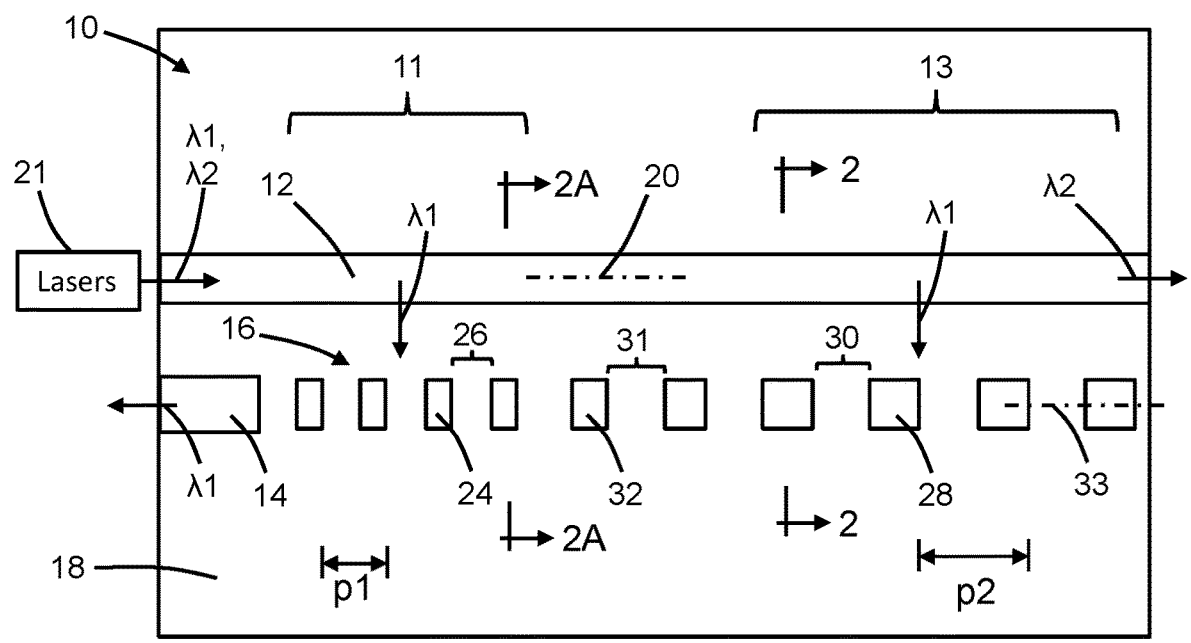
FIG. 1 is a top view of a structure at an initial fabrication stage of a processing method in accordance with embodiments of the invention.
Figure 2:
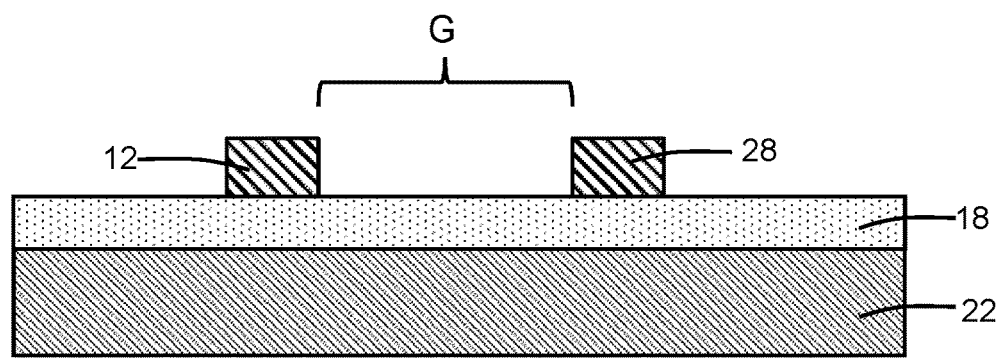
FIG. 2 is a cross-sectional view of the structure taken generally along line 2-2 in FIG. 1.
Figure 2A:
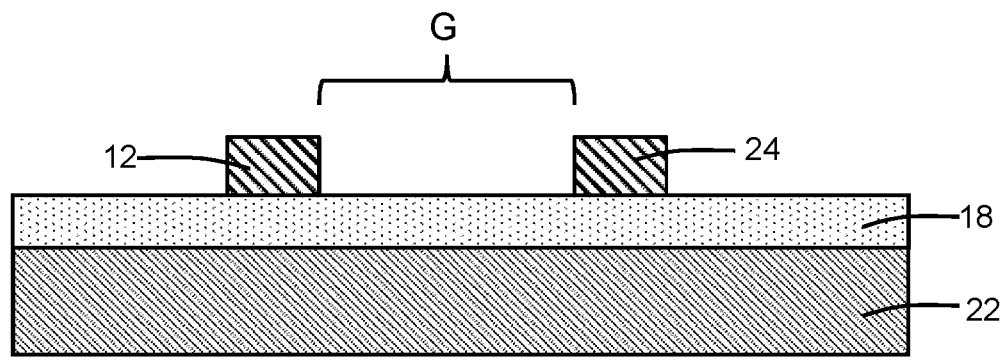
FIG. 2A is a cross-sectional view of the structure taken generally along line 2A-2A in FIG. 1.

With reference to FIGS. 1, 2, 2A and in accordance with embodiments of the invention, a structure 10 includes a waveguide core 12, a waveguide core 14, and a filter 16 that are arranged over a dielectric layer 18. The waveguide core 12 extends as a strip along a longitudinal axis 20. The waveguide core 12 provides a bus waveguide along which multiplexed channels of laser light, each of which is characterized by a different wavelength band, may commonly propagate and be guided. The waveguide core 12 may serve as an input port to the structure 10, and the waveguide core 12 may couple one or more optical components, such as one or more lasers 21 generating channels of laser light at the different wavelength bands, to the filter 16. The filter 16 is configured to transfer laser light from the waveguide core 12 to the waveguide core 14. The waveguide core 14, which may serve as an output port from the structure 10, may couple the filter 16 to an optical component, such as a photodetector.

The waveguide cores 12, 14 and filter 16 may be composed of a single-crystal semiconductor material, such as single-crystal silicon. In an embodiment, the waveguide cores 12, 14 and filter 16 may be composed of single-crystal silicon originating from a device layer of a silicon-on-insulator (SOI) wafer. The silicon-on-insulator wafer may further include a buried insulator layer composed of a dielectric material, such as silicon dioxide, that provides the dielectric layer 18 and a substrate 22 composed of a single-crystal semiconductor material, such as single-crystal silicon, under the buried insulator layer. The waveguide cores 12, 14 and filter 16 may be patterned from the device layer of the silicon-on-insulator wafer by lithography and etching processes during front-end-of-line processing, and the device layer may be fully etched to define rib structures for the waveguide cores 12, 14 and filter 16 as shown. Due to their concurrent formation from the same layer of material, the waveguide cores 12, 14 and filter 16 may be planar optical components having coplanar top and bottom surfaces. Alternatively, the single-crystal semiconductor material surrounding the waveguide cores 12, 14 and filter 16 may be partially etched, instead of fully etched, to provide a slab layer arranged on the dielectric layer 18 and connected to the waveguide cores 12, 14 and filter 16 to define ridge structures.

The filter 16 includes grating structures 24 that are separated by grooves 26, grating structures 28 that are separated by grooves 30, and grating structures 32 that are separated by grooves 31. In the representative embodiment, the grating structures 24, 28, 32 are rectangular features with substantially planar sidewalls. The grating structures 24, 28, 32 are positioned with a spaced arrangement along a longitudinal axis 33. The longitudinal axis 33 may be aligned parallel or substantially parallel to the longitudinal axis 20 of the waveguide core 12. The grating structures 24 are positioned adjacent to a section 11 of the waveguide core 12, and the grating structures 28 are positioned adjacent to a section 13 of the waveguide core 12. The waveguide core 12, including both of its sections 11, 13, may be laterally spaced from the filter 16 by a gap, G, which may be uniform or substantially uniform.

The grating structures 24 may have a given periodicity along the longitudinal axis 33 defined by a pitch, p1, and a filling factor or duty cycle. The pitch represents a distance along the longitudinal axis 33 between adjacent pairs of the grating structures 24, and the duty cycle represents a fraction of the total area that is occupied by the grating structures 24 as opposed to the grooves 26. The grating structures 28 have a pitch, p2, along the longitudinal axis 33 that is different than the pitch, p1, of the grating structures 24. Each of the pitches is less than the wavelength of laser light of the channel to which the filter 16 is directed such that the grating structures 24 and the grating structures 28 each provide sub-wavelength gratings. In an embodiment, the grating structures 24 and the grating structures 28 may have equal duty cycles in addition to the unequal pitches. In an alternative embodiment, the grating structures 24 and the grating structures 28 may have unequal duty cycles in addition to the unequal pitches.

The grating structures 32 are positioned along the longitudinal axis 33 between the grating structure 24 and the grating structures 28. The grating structures 32 provide a tapered transition between the pitch of the grating structures 24 and the pitch of the grating structures 28. To that end, the pitch of the grating structures 32 may continuously vary from the pitch of the grating structures 24 to the pitch of the grating structures 28 to provide the tapered transition.

In use, the waveguide core 12 may guide multiple channels of laser light as input into the filter 16. For example, the waveguide core 12 may carry a channel of laser light characterized by a wavelength band λ1 and another channel of laser light characterized by a wavelength band λ2. The channel of laser light characterized by the wavelength band λ1 may be transferred from the waveguide core 12 to the filter 16, and the channel of laser light characterized by the wavelength band λ2 may continue to be guided unimpeded in the waveguide core 12 past the filter 16. The filter 16 will remove the channel (i.e., the dropped channel) having the band of wavelengths (e.g., the wavelength band λ1) that satisfies the conditions for evanescent coupling from the waveguide core 12 to the filter 16, which are established by, for example, the different pitches of the grating structures 24 and the grating structures 28. The laser light characterized by the wavelength band λ2, which is not transferred, fails to satisfy the conditions for evanescent coupling.

The filter 16 includes multiple stages that provide the transfer of the dropped channel as different portions of its band of wavelengths. Specifically, a portion of the band of wavelengths for the dropped channel is evanescently coupled from the section 11 of the waveguide core 12 to the grating structures 24 and another portion of the band of wavelengths for the dropped channel is evanescently coupled from the section 13 of waveguide core 12 to the grating structures 28. The different transferred portions of the wavelength band collectively constitute a full wavelength band for the dropped channel that is transferred from the waveguide core 12 to the filter 16.

Other channels of laser light, which encompass different wavelength bands than the dropped channel, are not dropped and continue to be guided by the waveguide core 12 past the filter 16. Additional filters (not shown) similar to filter 16 may be provided downstream to separately remove each of the other channels (e.g., the channel of laser light having the wavelength band λ2). These additional filters may be wavelength tuned by, for example, adjusting the pitches of the grating structures 24, 28 of the filter 16 to provide the needed evanescent coupling.

Generally, the filter 16 is used to transfer a channel of laser light between the filter 16 and the waveguide core 12 with multiple transfer stages each including grating structures. In the representative embodiment, the filter 16 is used as a multiple-stage wavelength-division multiplexing filter to separate a dropped channel of laser light from multiple channels being guided by the waveguide core 12 in a demultiplexing operation. In an alternative embodiment, multiple instances of the filter 16 may be used as a multiple-stage wavelength-division multiplexing filter to transfer the different channels of laser light to the waveguide core 12 in a multiplexing operation.

Figure 3:
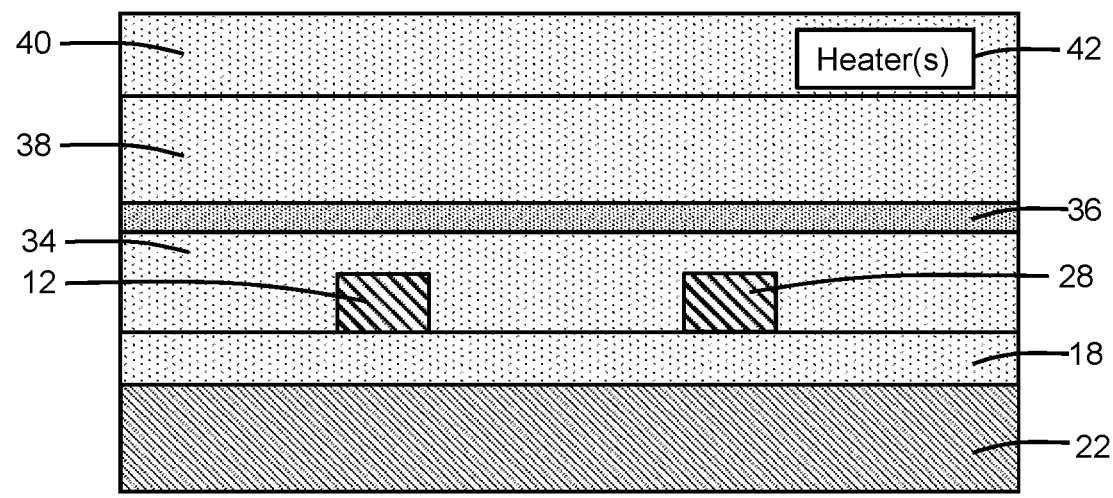
FIGS. 3 and 3A are cross-sectional views of the structure at a fabrication stage subsequent to FIGS. 2 and 2A.
Figure 3A:
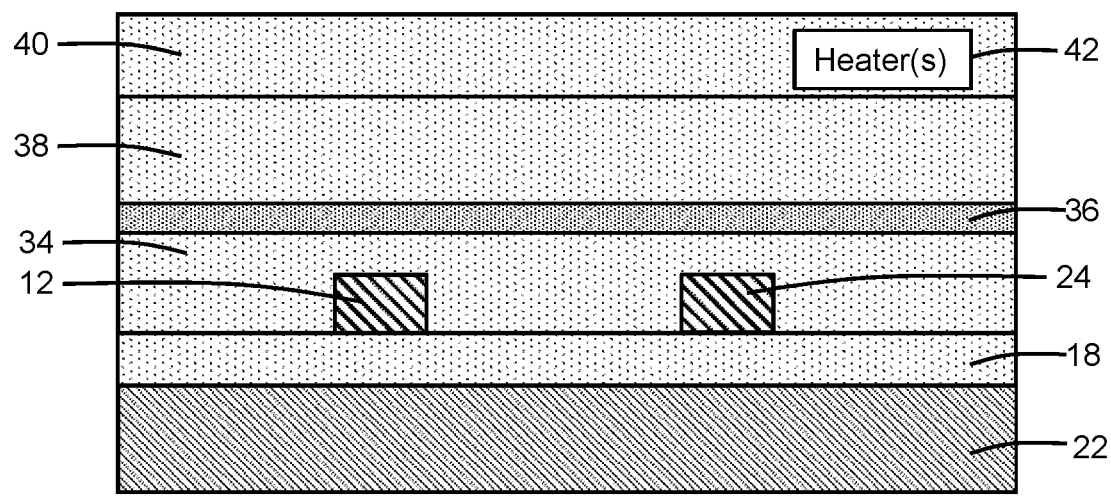

With reference to FIGS. 3, 3A in which like reference numerals refer to like features in FIGS. 2, 2A and at a subsequent fabrication stage, dielectric layers 34, 36, 38 are sequentially formed in a layer stack over the waveguide cores 12, 14 and filter 16. The waveguide cores 12, 14 and filter 16 may be embedded or buried in the dielectric material of the dielectric layer 34. The dielectric material of the dielectric layer 34 may also be located in the grooves 26 between the grating structures 24 and in the grooves 30 between the grating structures 28, as well as in the grooves 31 between the grating structures 32.

The dielectric layer 34 may be composed of a dielectric material, such as silicon dioxide, deposited by chemical vapor deposition and planarized with, for example, chemical mechanical polishing to remove topography. The dielectric layer 36 may be composed of a dielectric material, such as silicon nitride, deposited by chemical vapor deposition or atomic layer deposition over the dielectric layer 34. The dielectric layer 38 may be composed of a dielectric material, such as silicon dioxide, deposited by chemical vapor deposition or atomic layer deposition over the dielectric layer 36.

A back-end-of-line stack, generally indicated by reference numeral 40, is formed by back-end-of-line processing over the dielectric layer 38 and the structure 10. The back-end-of-line stack 40 may include one or more interlayer dielectric layers composed of one or more dielectric materials, such as a carbon-doped silicon oxide, and metallization composed of, for example, copper, tungsten, or aluminum that is arranged in the one or more interlayer dielectric layers.

In an alternative embodiment, one or more resistive heaters 42 may be located proximate to the filter 16. In an embodiment, the one or more resistive heaters 42 may be located in the back-end-of-line stack 40. The one or more resistive heaters 42 may be operated to provide heat energy used to thermally tune the filter 16 by shifting the wavelength band for the dropped channel. The one or more resistive heaters 42 may be connected with a control circuit that outputs regulated power to the one or more resistive heaters 42, and each resistive heater 42 converts the received power into heat energy that is conducted to the filter 16.

The structure 10, in any of the embodiments described herein, may be integrated into a photonics chip that includes electronic components and optical components formed on the same chip. For example, the electronic components may include field-effect transistors that are fabricated by CMOS front-end-of-line (FEOL) processing.

Figure 4:
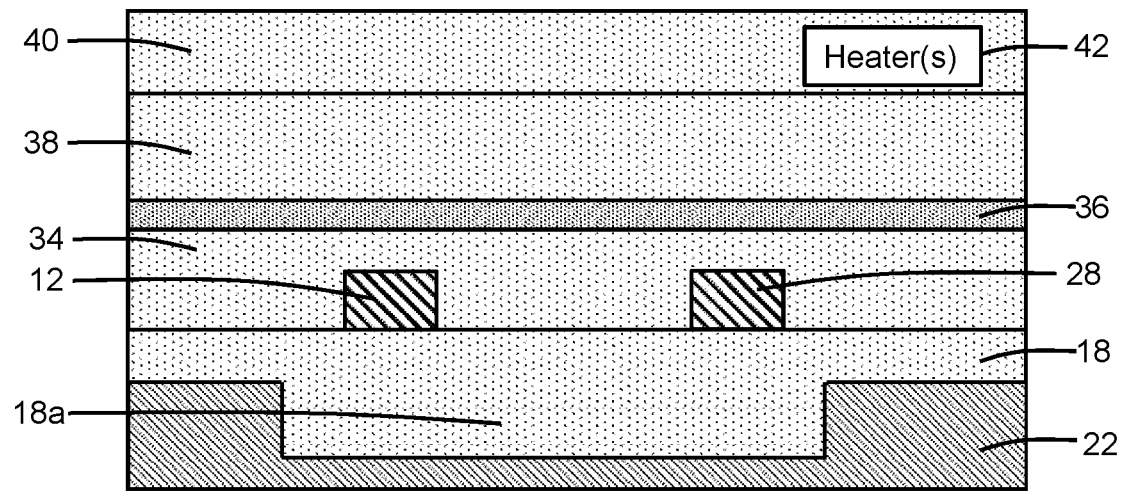
FIG. 4 is a cross-sectional view of a structure in accordance with alternative embodiments of the invention.

With reference to FIG. 4 in which like reference numerals refer to like features in FIG. 3 and in accordance with alternative embodiments of the invention, an undercut region 18a may be provided at a location beneath the filter 16. The undercut region 18a may be etched in the substrate 22 beneath the dielectric layer 18, and may be filled with a dielectric material, such as silicon dioxide. The dielectric material in the undercut region 18a locally increases the effective thickness of the dielectric layer 18 under the filter 16. In the representative embodiment, the undercut region 18a has a rectangular shape. In an alternative embodiment, the undercut region 18a may have a V-shape.

Figure 5:
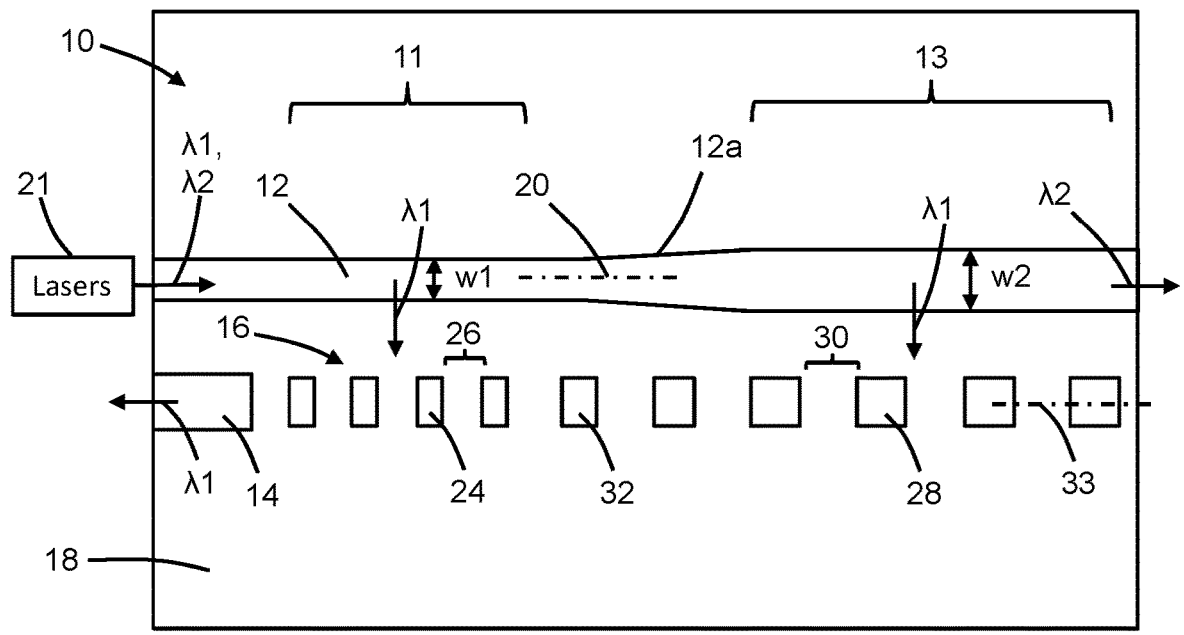
FIGS. 5-7 are top views of structures in accordance with alternative embodiments of the invention.

With reference to FIG. 5 in which like reference numerals refer to like features in FIG. 1 and in accordance with alternative embodiments of the invention, the waveguide core 12 may be modified such that the section 11 adjacent to the grating structures 24 of the filter 16 has a width, w1, and the section 13 adjacent to the grating structures 28 of the filter 16 has a width, w2. In the representative embodiment, the width, w2, of the section 13 is greater than the width, w1, of the section 11. A taper 12a may be added to the waveguide core 12 to provide a transition between the sections 11, 13 of different width. The width change may be used to assist in the selection of the wavelength band for the channel transferred to or from the filter 16 in each of the different filter stages.

Figure 6:
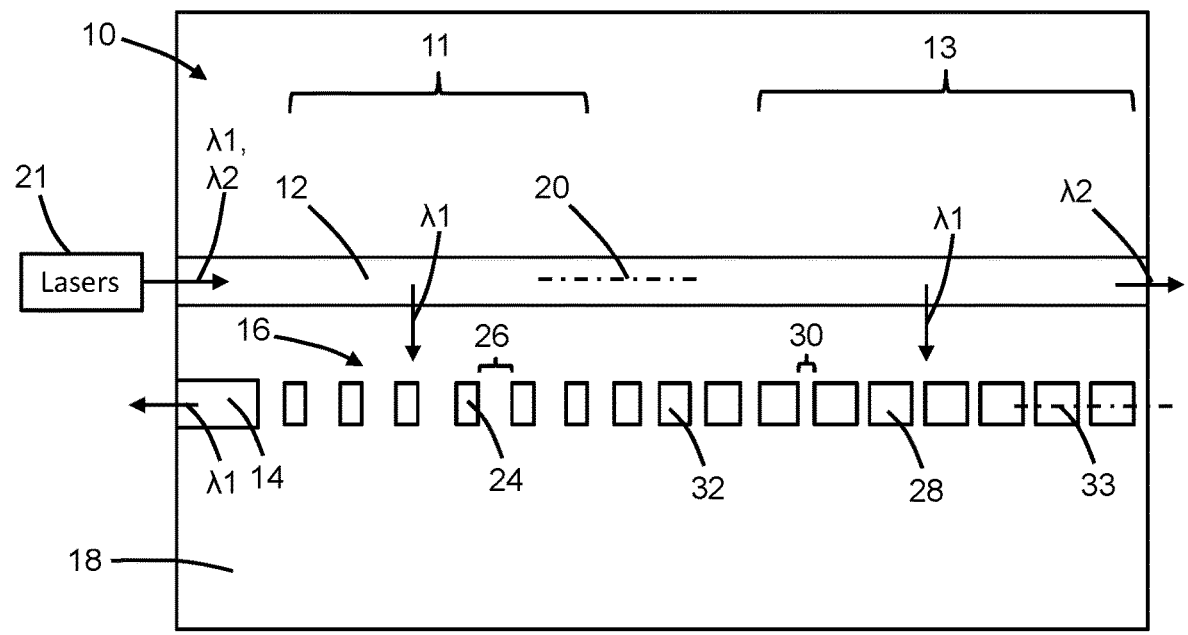

With reference to FIG. 6 in which like reference numerals refer to like features in FIG. 1 and in accordance with alternative embodiments of the invention, the grating structures 28 may have a different duty cycle than the grating structures 24. In the representative embodiment, the duty cycle of the grating structures 28 is greater than the duty cycle of the grating structures 24, and the pitches of the grating structures 24 and the grating structures 28 are equal. The differences in the duty cycle introduce a difference between the portion of the dropped wavelength band associated with the grating structures 24 of the filter 16 and the portion of the dropped wavelength band associated with the grating structures 28 of the filter 16.

Figure 7:
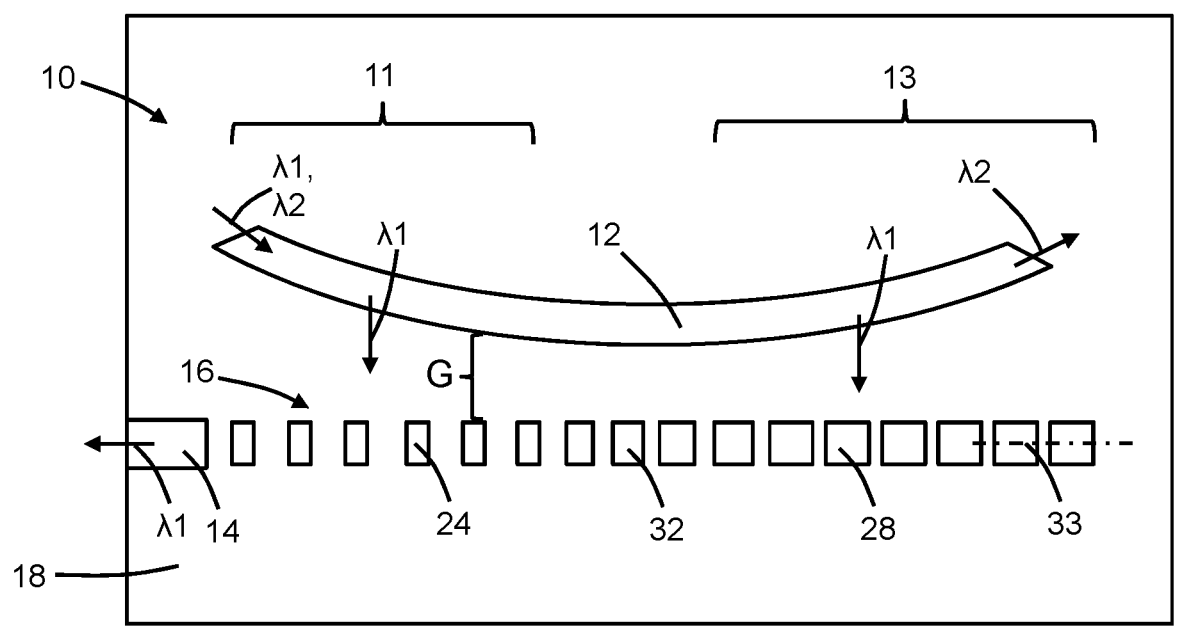

With reference to FIG. 7 in which like reference numerals refer to like features in FIG. 1 and in accordance with alternative embodiments of the invention, the waveguide core 12 may be curved or bent instead of straight or linear. The curvature of the waveguide core 12 introduces a variable gap, G, between each of the sections 11, 13 of the waveguide core 12 and the filter 16. The dimension of the variable gap is a function of position relative to the longitudinal axis 33 along which the grating structures 24, 28, 32 are aligned. The waveguide core 12 may be closest to the filter 16, and therefore the variable gap may have a minimum value, near the transition region that includes the grating structures 32. In an embodiment, the variable gap may be symmetrical about the transition region.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a waveguide core having a first section and a second section; and
   a filter coupled to the waveguide core, the filter including a first plurality of grating structures positioned adjacent to the first section of the waveguide core and a second plurality of grating structures positioned adjacent to the second section of the waveguide core, the first plurality of grating structures are configured to cause laser light in a first portion of a wavelength band to be transferred between the first section of the waveguide core and the first plurality of grating structures, and the second plurality of grating structures are configured to cause laser light in a second portion of the wavelength band to be transferred between the second section of the waveguide core and the second plurality of grating structures, wherein the first plurality of grating structures have a first duty cycle, and the second plurality of grating structures have a second duty cycle that is greater than the first duty cycle.

2. The structure of claim 1 wherein the first plurality of grating structures have a first pitch, and the second plurality of grating structures have a second pitch that is greater than the first pitch.

3. The structure of claim 1 wherein the waveguide core includes a taper that connects the first section to the second section.

4. The structure of claim 1 further comprising:
a heater located proximate to the filter.

5. The structure of claim 4 further comprising:
a back-end-of-line stack over the filter and the waveguide core,
wherein the heater is located in the back-end-of-line stack.

6. The structure of claim 1 wherein the waveguide core and the filter are located over a buried insulator layer of a silicon-on-insulator wafer.

7. The structure of claim 6 wherein the silicon-on-insulator wafer further includes a substrate separated from the filter by the buried insulator layer, and the substrate includes an undercut beneath the filter and a dielectric material in the undercut.

8. The structure of claim 1 wherein the first plurality of grating structures and the second plurality of grating structures are arranged along a longitudinal axis, and the waveguide core is curved relative to the longitudinal axis to provide a gap relative to the filter that varies as a function of position relative to the longitudinal axis.

9. The structure of claim 8 wherein the filter includes a transition region located between the first plurality of grating structures and the second plurality of grating structures, and the gap has a minimum value at the transition region.

10. The structure of claim 1 further comprising:
one or more dielectric layers over the filter and the waveguide core.

11. The structure of claim 10 further comprising:
a substrate; and
a back-end-of-line stack over the substrate,
wherein the filter, the waveguide core, and the one or more dielectric layers are positioned between the substrate and the back-end-of-line stack.

12. The structure of claim 1 wherein the waveguide core and the filter are substantially coplanar.

13. The structure of claim 1 wherein the waveguide core and the filter are comprised of a single-crystal semiconductor material.

14. The structure of claim 1 wherein the first plurality of grating structures are configured to cause the laser light in the first portion of the wavelength band to be transferred from the first section of the waveguide core to the first plurality of grating structures, and the second plurality of grating structures are configured to cause the laser light in the second portion of the wavelength band to be transferred from the second section of the waveguide core to the second plurality of grating structures.

15. The structure of claim 14 further comprising:
a laser coupled to the waveguide core, the laser configured to provide a channel including the laser light in the first portion of the wavelength band and the laser light in the second portion of the wavelength band.

16. The structure of claim 1 wherein the first plurality of grating structures are configured to cause the laser light in the first portion of the wavelength band to be transferred from the first plurality of grating structures to the first section of the waveguide core, and the second plurality of grating structures are configured to cause the laser light in the second portion of the wavelength band to be transferred from the second plurality of grating structures to the second section of the waveguide core.

17. A method comprising:
forming a waveguide core;
forming a first plurality of grating structures positioned adjacent to a first section of the waveguide core; and
forming a second plurality of grating structures positioned adjacent to a second section of the waveguide core,
wherein the first plurality of grating structures have a first duty cycle, the second plurality of grating structures have a second duty cycle that is greater than the first duty cycle, the first plurality of grating structures are configured to cause laser light in a first portion of a wavelength band to be transferred between the first section of the waveguide core and the first plurality of grating structures, and the second plurality of grating structures are configured to cause laser light in a second portion of the wavelength band to be transferred between the second section of the waveguide core and the second plurality of grating structures.

18. The method of claim 17 wherein the first plurality of grating structures have a first pitch, and the second plurality of grating structures have a second pitch that is greater than the first pitch.

19. The structure of claim 1 wherein the first plurality of grating structures and the second plurality of grating structures are arranged along a first longitudinal axis, and the waveguide core has a second longitudinal that is aligned substantially parallel to the first longitudinal axis.

20. The structure of claim 1 wherein the first plurality of grating structures have a first pitch, and the second plurality of grating structures have a second pitch that is equal to the first pitch.

* * * * *